United States Patent
Gould et al.

(10) Patent No.: US 6,570,489 B1
(45) Date of Patent: May 27, 2003

(54) TELEPHONE COMMUNICATION SYSTEM WITH INTEGRATED PAGER FUNCTIONALITY

(75) Inventors: Kevin W. Gould, Tinton Falls, NJ (US); Majid Ressalei, Brick, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/271,662

(22) Filed: Mar. 17, 1999

(51) Int. Cl.$^7$ ................................................ G08B 5/22
(52) U.S. Cl. ...................... 340/7.28; 455/458; 455/426; 455/465; 455/462
(58) Field of Search ................................ 455/410, 422, 455/426, 458, 456, 38.1, 414, 417, 465, 11.1, 466, 461; 340/825.18, 825.44, 7.2, 7.21, 7.58, 7.28

(56) References Cited

U.S. PATENT DOCUMENTS

| | | | | |
|---|---|---|---|---|
| 4,680,785 A | * | 7/1987 | Akiyama et al. | 340/7.21 |
| 5,090,051 A | * | 2/1992 | Muppidi et al. | 455/410 |
| 5,175,758 A | | 12/1992 | Levanto et al. | |
| 5,418,835 A | * | 5/1995 | Frohman | 455/413 |
| 5,463,672 A | * | 10/1995 | Kage | 455/458 |
| 5,485,463 A | * | 1/1996 | Godoroja | 370/333 |
| 5,513,243 A | * | 4/1996 | Kage | 455/456 |
| 5,559,859 A | * | 9/1996 | Dai et al. | 455/459 |
| 5,812,946 A | * | 9/1998 | Nakabayashi et al. | 455/426 |
| 5,828,949 A | * | 10/1998 | Silver et al. | 379/170 |
| 5,877,700 A | * | 3/1999 | Suzuki | 340/7.1 |
| 5,995,804 A | * | 11/1999 | Rootsey et al. | 455/11.1 |
| 6,011,953 A | * | 1/2000 | Foladare et al. | 455/38.1 |
| 6,016,425 A | * | 1/2000 | Bannister | 455/422 |
| 6,101,384 A | * | 8/2000 | Jang | 455/426 |
| 6,125,176 A | * | 9/2000 | Foladare et al. | 379/211 |
| 6,134,436 A | * | 10/2000 | Ezaki | 455/426 |
| 6,141,531 A | * | 10/2000 | Williams et al. | 455/555 |

FOREIGN PATENT DOCUMENTS

| | | | | |
|---|---|---|---|---|
| GB | 2177244 A | * | 1/1987 | H04B/5/04 |

* cited by examiner

Primary Examiner—Nay Maung
Assistant Examiner—Sonny Trinh
(74) Attorney, Agent, or Firm—Ryan, Mason & Lewis, LLP

(57) ABSTRACT

An indoor wireless communication system with integrated pager functionality for receiving and routing external pager messages to recipient end terminals, such as wired or wireless telephones, without the need for a separate pager device. The indoor wireless communication system includes a system controller for receiving external pager messages and extracting external pager identification of the recipient pager device from the header of the external pager message. A database stored in the system controller is used to relate the external pager identification of the recipient pager to an internal terminal identification that is recognized by the indoor wireless communication system. The external pager message is then transmitted to the recipient end terminal based on the related internal terminal identification. Accordingly, the subscribers to an indoor wireless communication system are able to receive external pager messages without having to carry a separate pager device in addition to the wireless telephone.

31 Claims, 3 Drawing Sheets

TELEPHONE COMMUNICATION SYSTEM WITH INTEGRATED PAGER FUNCTIONALITY

FIELD OF THE INVENTION

The present invention relates to a telephone communication system within a building or facility, and in particular to an indoor wireless telephone communication system with integrated pager functionality.

DESCRIPTION OF RELATED ART

Audio or voice calls can be transmitted to hand held wireless telephones via a wireless communication system. Wireless communication systems may be "outdoors", wherein wireless cellular telephones communicate via mobile units stationed outside of buildings, or "indoors", in which communication service is provide to multiple end terminals within a building or facility by base stations located internally therein. One example of an indoor wireless communication system is the DEFINITY wireless business system (DWBS) manufactured by Lucent Technologies. An indoor wireless communication system is similar to a cordless telephone, except that a single telephone is not associated with a single base, instead telephone communication service is provided to multiple end terminals throughout the building using a plurality of internally located base stations. Each base station is capable of handling a multitude of calls. As an end terminal device is moved throughout the building, in which the indoor wireless communication system is installed, continuous communication service is provided by passing off the call among the base stations. The DWBS indoor wireless communication system is advantageous in that it operates in the unlicenced personal communications service (PCS) band and thus, unlike outdoor cellular communication systems, does not have an associated air time charge. The indoor wireless communication system receives external audio calls and transmits the calls to their recipient end terminal. In addition, internal audio calls can be transmitted between end terminals. The indoor wireless communication system may integrate well known call features, such as caller identification which displays the telephone number of the calling party of an external audio call, or the name of the calling party associated with the end terminal, if the call is among end terminals of the indoor wireless communication system.

In addition to incoming audio calls, subscribers to an indoor wireless communication system may also receive incoming pager messages. In order for an end terminal in an indoor wireless communication system to receive both audio calls and alphanumeric pager messages, the subscriber must carry a wireless telephone and a separate paging device. Having to carry two devices around is cumbersome and inconvenient.

It is therefore desirable to develop an indoor wireless communication system that integrates pager message functionality, thereby eliminating the need to carry a separate pager device in addition to a hand held wireless telephone.

SUMMARY OF THE INVENTION

The present invention is directed to an indoor wireless communication system with integrated pager functionality and a method of using the same.

In an exemplary embodiment of the invention, a system is provided that includes a plurality of end terminals (wireless telephones and/or wired telephones), each having an assigned internal terminal identification. These end terminals are in wired or wireless communication with one or more base stations located within the facility where the end terminals are located. External audio calls and pager messages from outside, as well as within the building, are routed to the appropriate terminals. A system controller receives external pager messages that identify a recipient pager device for the message with an external pager identification in the header of the message. The system controller relates the external pager identification to the internal terminal identification of a recipient end terminal using a database or look-up table. Accordingly, external pager messages may be received at end terminals (wired and/or wireless telephones) in an indoor wireless communication system without the need for separate pager devices.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
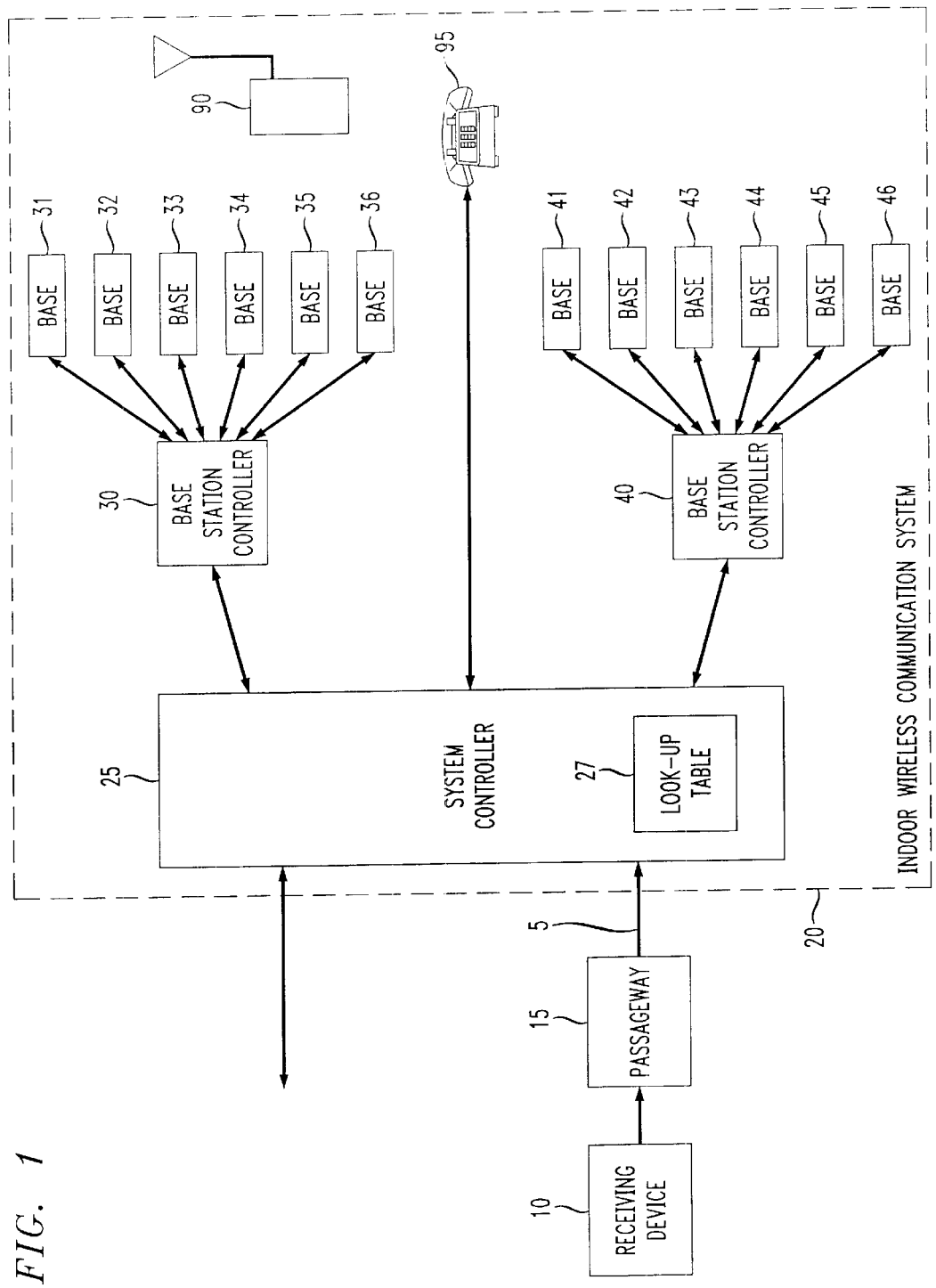
FIG. 1 is an example of an indoor wireless telephone communication system with integrated pager functionality in accordance with the present invention.

An example of an indoor wireless communication system 20 with integrated paging functionality in accordance with the invention is shown in FIG. 1. External alphanumeric pager messages are transmitted to a pager receiving device 10. In the preferred embodiment as shown in FIG. 1, receiving device 10 is connected to the indoor wireless communication system 20 by way of an external controlling device 15, such as a PASSAGEWAY PC sold by Lucent Technologies, Inc., that provides a set of programming libraries for externally controlling the terminals of a system controller 25. In particular, the PASSAGEWAY PC product may be used to control the DWBS via an NT-based PC application. It is within the intended scope of the invention, however, to use the indoor wireless communication system without an external controlling device.

The system controller 25 receives incoming audio calls and external alphanumeric pager messages that include a header with the recipient's telephone number or external pager identification, respectively, by way of a wired connection 5. The external pager identification in the header of the pager message is detected by the indoor wireless communication system, which identifies the end terminals using an internal terminal identification independent of the external pager identifications used by the external paging service. Thus, upon receiving an external pager message, the system controller 25 extracts the external pager identification of the recipient pager device specified in the header, and then maps or relates the extracted external pager identification to a corresponding internal terminal identification of a recipient end terminal using a database or look-up-table.

By way of example, the indoor wireless communication system shown and described in FIG. 1 has two base station controllers 30, 40, with each base station controller connected to a predetermined number of base stations, referred to as a "cluster". For example, base station controller 30 is connected to a cluster of 6 base stations 31, 32, 33, 34, 35, 36. Although FIG. 1 shows 6 base stations in each cluster, it is within the intended scope of the invention to define the cluster, as desired, to include any number of two or more base stations. Furthermore, any number of base station controllers may be used or, alternatively, the use of base station controllers may be eliminated by directly connecting the system controller to each base station. It is advantageous, however, to use base station controllers to reduce the number of base stations to which the incoming audio call or pager message must be transmitted, thereby using less bandwidth.

The indoor wireless communication system has a plurality of end terminals, such as wireless telephones and wired telephones. One wireless telephone 90 and an associated wired telephone 95 having the same internal terminal identification are shown in FIG. 1. However, any number of end terminals having any number of different internal terminal identifications may be used as desired. Each base station provides communication service within a particular geographical range within the facility serviced by the indoor wireless communication system 20. At any point in time, communication service is provided to each end terminal by a single base station. In a preferred embodiment in which the base stations are classified into clusters, each cluster has a geographical range of communication service defined by the overall or combined service range provided by its associated base stations. As wireless telephone 90 is moved about the facility it registers its identification with a new cluster and this information is passed on to the system controller 25 much like a "hand off" in a conventional cellular communication system. In particular, as the end terminal exits the geographical service range of one cluster and enters the service range of a new cluster, the registration information concerning which cluster is in communication with the terminal is passed to the system controller. In this manner, the location of each wireless end terminal is continuously tracked within the building.

After determining the internal terminal identification of the recipient end terminal at the system controller 25, the external pager message is routed via wires through the building to the base station controller associated with the registered cluster of the recipient end terminal. In turn, the base station controller broadcasts the pager message to each base station in its associated cluster. The particular base station that provides communication service to the recipient end terminal based on its geographical location then transmits the external pager message to the recipient end terminal. In a preferred embodiment, the external pager messages may be presented to multiple end terminals in a bridging arrangement, such as to the wired telephone 95 and the wireless telephone 90.

In addition to routing external pager messages to telephone end terminals within a building or facility, the indoor wireless communication system in accordance with the present invention may be used to establish voice communication between telephone end terminals within a building or facility, or between end terminals in the facility and external telephones, via the system controller.

Figure 2A:
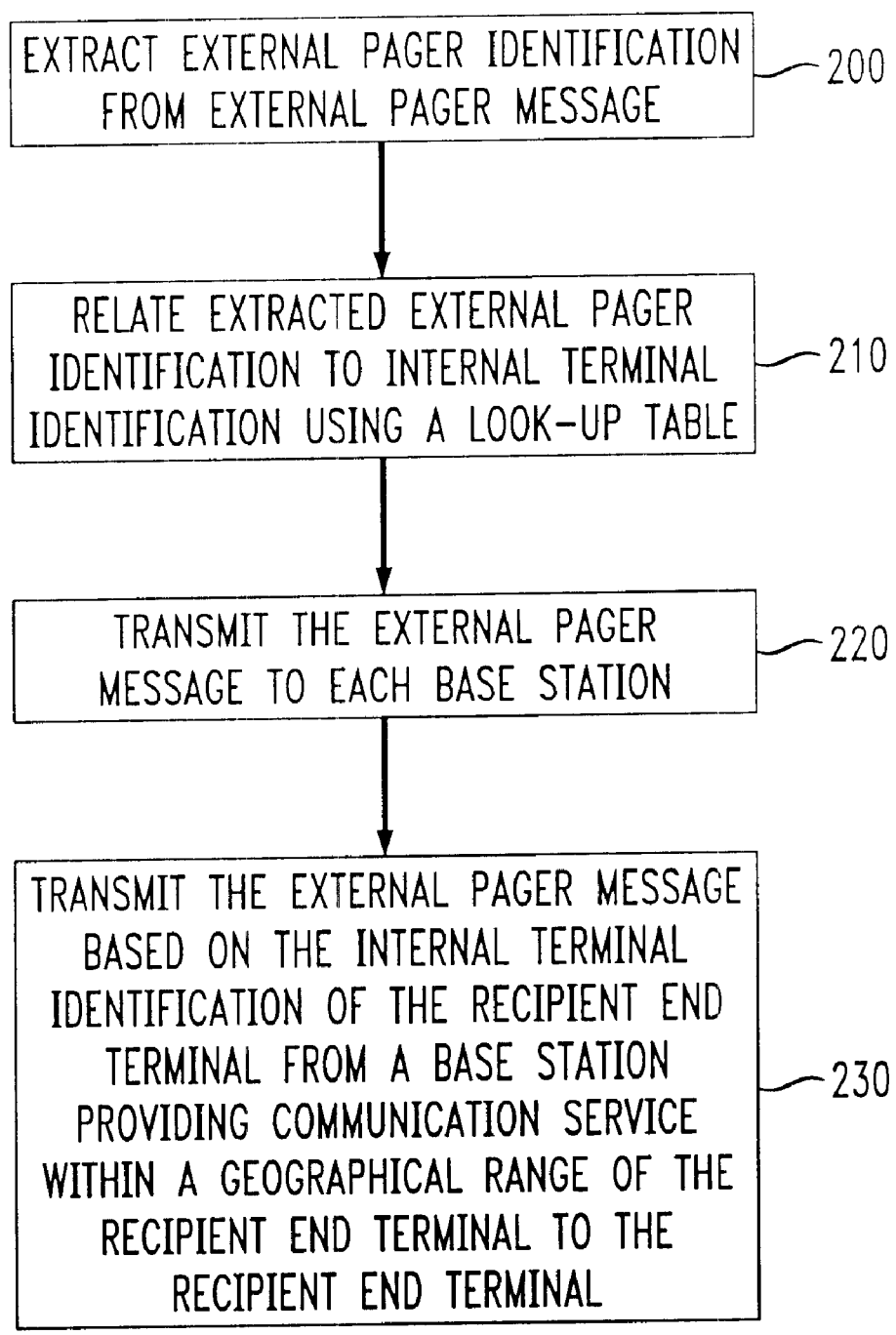
FIG. 2a is a flow chart of one method of using an indoor wireless communication system with integrated pager functionality in accordance with the present invention.

FIG. 2*a* is a flow chart of one embodiment of the operation of the integrated pager message functionality in an indoor wireless communication system in accordance with the present invention. An external pager message with an external pager identification specified in the header is received at receiving device 10 and transmitted to the indoor wireless communication system 20, preferably via PASSAGEWAY 15. System controller 25 receives the external pager message, extracts the external pager identification from the header in step 200, and maps or relates the extracted external pager identification to a corresponding internal terminal identification recognized by the indoor wireless communication system in step 210. This is accomplished by utilizing a database or look-up table 27 in the system controller. The external pager message is then transmitted to each base station in step 220. Thereafter, in step 230 the external pager message is transmitted, based on the related internal terminal identification of the recipient end terminal, from a base station providing communication service in a geographical range of the recipient end terminal to the recipient terminal.

Figure 2B:
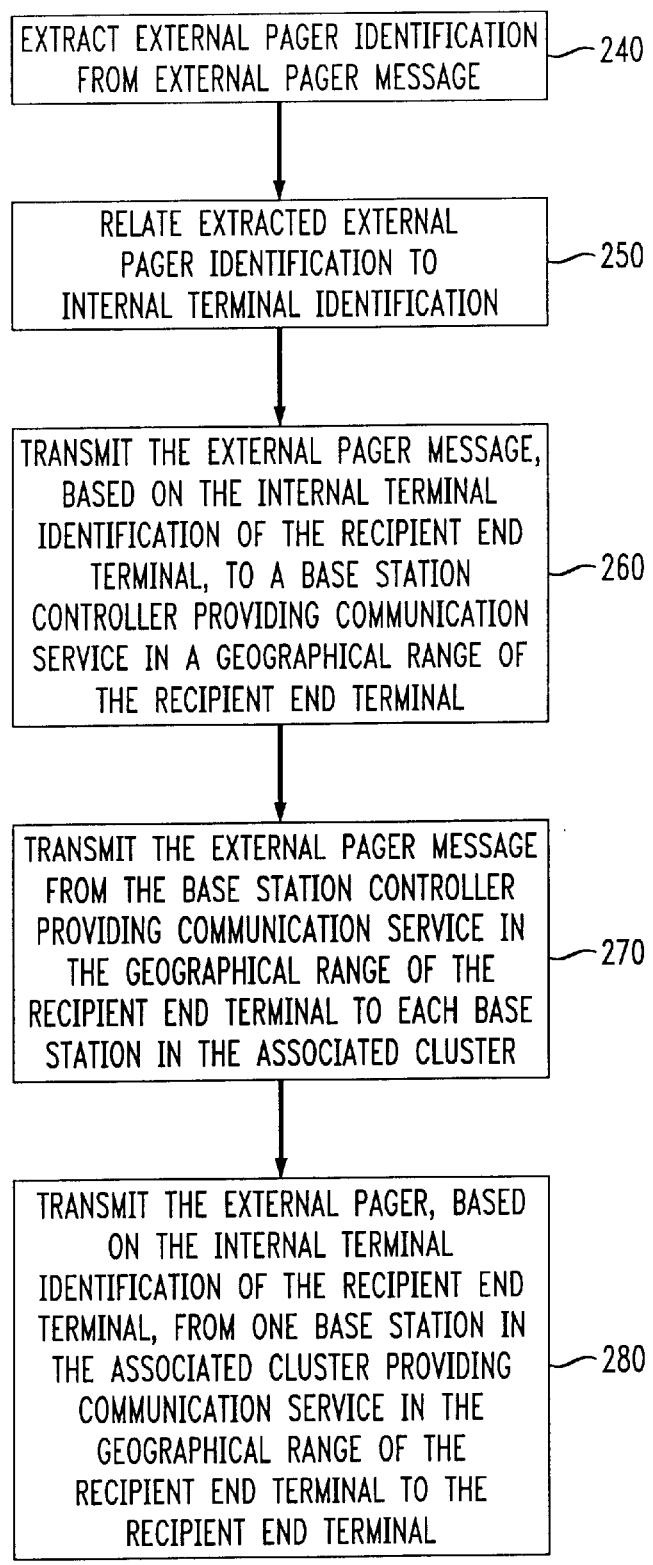
FIG. 2b is a flow chart of another method of using an indoor wireless communication system with integrated pager functionality in accordance with the present invention.

In an alternate construction, the indoor wireless communication system includes at least one base station controller, and each base station controller has an associated group or cluster of base stations connected thereto. FIG. 2*b* is a flow chart of the method of using this alternate indoor wireless communication system. Steps 240 and 250 are analogous to the first two steps 210, 220 in FIG. 2*a* and thus, will not be described further. In step 260, the external pager message is transmitted, based on the related internal terminal identification of the recipient end terminal, to the base station controller providing communication service in a geographical range of the recipient end terminal. Thereafter, in step 270 the external pager message is transmitted from the base station controller providing communication service in the geographical range of the recipient end terminal to each base station in the associated cluster. In step 280, the external pager message is transmitted, based on the internal terminal identification of the recipient end terminal, from the one base station in the associated cluster that provides communication service in the geographical range of the recipient end terminal to the recipient end terminal.

In a preferred embodiment, a pager indication, such as a special ring and/or vibration of the handheld wireless telephone, is used to signal receipt of the pager message. At the recipient end terminal, the alphanumeric pager message is viewed on a liquid crystal display (LCD) or some other display device.

Accordingly, the present invention eliminates the need for the subscriber of an indoor wireless communication system to have to carry a separate pager device, in addition to the handheld wireless telephone, in order to receive pager messages. By integrating pager message functionality into the indoor wireless communication system the enhanced features, such as bridging between multiple end terminal devices and call forwarding, are also applicable to incoming external pager messages. Subscribers to an indoor wireless communication system may reconfigure the system controller from their respective end terminal devices, thereby changing the end terminal devices to which the incoming external pager messages are to be transmitted.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, while the system of the present invention is termed an "indoor wireless communication system", the properties of the invention can be used outside a building in a large confined area or in a facility encompassing several buildings and open spaces. Furthermore, wireless terminals are not required. Pager messages may be received by the system controller and routed to wired terminals. It is also expressly intended that all combinations of those elements and/or method steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A communication system with integrated pager functionality comprising:
    a plurality of telephone end terminals each having an assigned internal terminal identification within the system, each telephone end terminal not including pager circuitry; and
    a system controller for controlling communication inside the system, said system controller: (a) receiving external pager messages as a telephone signal, each external pager message having an external pager identification for a recipient pager device within the system, and (b) relating the external pager identification to the internal terminal identification of a recipient end terminal;
    wherein said external pager message is transmittable to said recipient end terminal based on said related internal terminal identification.

2. A system in accordance with claim 1, wherein said end terminals are wireless telephones and wired telephones.

3. A system in accordance with claim 2, further comprising:
    at least one base station electrically connected to said system controller, said at least one base station receiving said external pager message from said system controller, one base station providing communication service in a geographical range of said recipient end terminal and transmitting said external pager message to said recipient end terminal based on the internal terminal identification.

4. A system in accordance with claim 2, wherein said recipient end terminal comprises a recipient wired telephone and a recipient wireless telephone having the same internal terminal identification.

5. A system in accordance with claim 4, wherein said external pager message is transmitted to said recipient wired and recipient wireless telephones.

6. A system in accordance with claim 3, wherein wireless communication between said at least one base station and said plural end terminals is by way of a personal communications service band.

7. A system in accordance with claim 1, wherein each end terminal has a display for viewing said external pager message.

8. A system in accordance with claim 1, wherein each end terminal includes pager indication means for signaling receipt of an external pager message.

9. A system in accordance with claim 7, wherein said pager indication means comprises at least one of means for generating a special ring and means for vibrating said end terminal.

10. A system in accordance with claim 1, wherein said system controller includes a database for relating said external pager identification to said internal terminal identification.

11. A system in accordance with claim 10, wherein said database is reconfigurable at said end terminals to change to which of said plural end terminals said external pager message is to be routed.

12. A system in accordance with claim 1, wherein the system is designed for a limited geographical area.

13. A system in accordance with claim 12, wherein the limited geographical area is one of a building and a facility.

14. A system in accordance with claim 1, wherein said system controller converts said external pagers message to internal telephone signals and transmits said converted internal telephone signal to said recipient end terminal user based on said related internal terminal identification.

15. A communication system with integrated pager functionality comprising:
    a plurality of telephone end terminals each having an assigned internal terminal identification within the system, each telephone end terminal not including pager circuitry;
    a system controller for controlling communication inside the system, said system controller: (a) receiving external pager messages as a telephone signal, each external pager message having an external pager identification for a recipient pager device within the system, and (b) relating the external pager identification to the internal terminal identification of a recipient end terminal;
    a plurality of base station controllers electrically connected to said system controller, said external page message being received by one base station controller providing communication service in geographical range of said recipient end terminal; and
    a plurality of base stations being grouped by a predetermined number into respective clusters, said base stations in each cluster being electrically connected to an associated base station controller, said external pager message being received by each base station in the associated cluster of said base station controller providing communication service in a geographical range of said recipient end terminal, one base station in the associated cluster providing communication service in the geographical range of said recipient end terminal and transmitting said external pager message to said recipient end terminal based on the internal terminal identification.

16. A system in accordance with claim 15, wherein each cluster has at least two base stations connected thereto.

17. A method for using a telephone communication system with integrated pager functionality, said telephone communication system including a system controller and a plurality of end terminals, each end terminal having an assigned internal terminal identification, each end terminal not including pager circuitry, comprising:
    (a) extracting an external pager identification from an external pager message received as a telephone signal;
    (b) relating said extracted external pager identification to the internal terminal identification of a recipient end terminal; and
    (c) transmitting said external pager message to said recipient end terminal based on said related internal terminal identification.

18. A method in accordance with claim 17, wherein said plural end terminals are wired telephones and wireless telephones.

19. A method in accordance with claim 17, wherein said extracted external pager identification is related to the internal terminal identification of a recipient end terminal using one of a look-up table and database.

20. A method in accordance with claim 18, wherein said transmitting step (c) comprises:

(d) transmitting said external pager message from said system controller to at least one base station electrically connected thereto; and (e) transmitting said external pager message, based on said related internal terminal identification, from one base station providing communication service in a geographical range of said recipient end terminal to said recipient end terminal.

21. A method in accordance with claim 18, wherein said transmitting step (e) comprises transmitting said external pager message to a recipient wireless telephone and a recipient wired telephone having the same internal terminal identification.

22. A method in accordance with claim 20, wherein said transmitting step (e) comprises transmitting said external pager message between said base station providing communication service in the geographical range of said recipient end terminal and said recipient end terminal by way of a personal communications service band.

23. A method in accordance with claim 17, further comprising displaying said external pager message at said recipient end terminal.

24. A method in accordance with claim 17, further comprising indicating receipt of said external pager message at said recipient end terminal using a pager indication means.

25. A method in accordance with claim 24, wherein said indicating step comprises initiating a special ring at said recipient end terminal upon receipt of said external pager message.

26. A method in accordance with claim 24, wherein said indicating step comprises initiating vibration at said recipient end terminal upon receipt of said external pager message.

27. A method in accordance with claim 17, wherein said relating step (b) comprises remotely reconfiguring said system controller at said end terminals to change to which of said plural end terminals said external pager message is to be routed.

28. A method in accordance with claim 18, wherein said transmitting step (c) further comprises:

(f) transmitting said external pager message, based on said related internal terminal identification, from said system controller to one base station controller, from a plurality of base station controllers, providing communication service in a geographical range of said recipient end terminal; and (g) transmitting said external pager message, based on said related internal terminal identification, from said base station controller providing communication service in the geographical range of said recipient end terminal to a plurality of base stations connected thereto; and (h) transmitting said external pager message, based on said related internal terminal identification, from one base station providing communication service in the geographical range of said recipient end terminal to said recipient end terminal.

29. A method in accordance with claim 17, wherein said transmitting step comprises:

(e) converting said external pager message to an internal telephone signal; and (f) transmitting said converted internal telephone signal to said recipient end terminal user based on said related internal terminal identification.

30. A communication system with integrated pager functionality comprising:

a plurality of telephone end terminals each having an assigned internal terminal identification within the system; and a system controller for controlling communication inside the system, said system controller: (a) receiving external pager messages each having an external pager identification for a recipient pager device within the system, (b) relating the external pager identification to the internal terminal identification of a recipient end terminal, (c) converting at least one of said external pager messages to a corresponding internal telephone signal, and (d) transmitting said converted internal telephone signal to said recipient end terminal based on said related internal terminal identification.

31. A method for using a telephone communication system with integrated pager functionality, said telephone communication system including a system controller and a plurality of end terminals, each end terminal having an assigned internal terminal identification, comprising:

(a) extracting an external pager identification from a received external pager message;

(b) relating said extracted external pager identification to the internal terminal identification of a recipient end terminal;

(c) converting said external pager message to an internal telephone signal; and (d) transmitting said converted internal telephone signal to said recipient end terminal based on said related internal terminal identification.

* * * * *